United States Patent [19]

Inoue et al.

[11] Patent Number: 5,399,402
[45] Date of Patent: Mar. 21, 1995

[54] AIR BAG COATING COMPOSITION AND AIR BAG

[75] Inventors: Yoshio Inoue; Kazuma Momii, both of Annaka, Japan

[73] Assignee: Shin-Etsu Chemical Co., Ltd., Tokyo, Japan

[21] Appl. No.: 186,491

[22] Filed: Jan. 26, 1994

Related U.S. Application Data

[63] Continuation of Ser. No. 8,107, Jan. 25, 1993, abandoned.

[30] Foreign Application Priority Data

Jan. 23, 1992 [JP] Japan ................... 4-034201

[51] Int. Cl.$^6$ ............ B29D 22/00; B60R 21/20; B05D 3/02
[52] U.S. Cl. ................... 428/35.7; 524/862; 524/837; 528/15; 528/31; 528/32; 280/743 R; 427/387
[58] Field of Search .......... 524/862, 837; 528/15, 528/31, 32; 280/743 R; 427/387; 428/35.7

[56] References Cited

U.S. PATENT DOCUMENTS

| | | | |
|---|---|---|---|
| 4,399,193 | 8/1983 | Preiner et al. | 524/837 |
| 4,443,579 | 4/1984 | Doin et al. | 524/837 |
| 4,464,506 | 8/1984 | Alberts et al. | 524/588 |
| 5,095,067 | 3/1992 | Hara et al. | 524/506 |
| 5,254,621 | 10/1993 | Inoue et al. | 524/837 |
| 5,296,298 | 3/1994 | Fujimoto et al. | 524/265 |

FOREIGN PATENT DOCUMENTS

| | | |
|---|---|---|
| 0084772 | 8/1983 | European Pat. Off. . |
| 2401195 | 3/1979 | France . |

OTHER PUBLICATIONS

Itsushiki et al., "Air bags", *Chemical Abstracts*, vol. 116, No. 12, Abstract No. 108237k.

Hara et al., "Silicone Emulsion Composition For Release Paper And Its Production", *Patent Abstracts of Japan*, vol. 13, No. 158 (C–586), Apr. 17, 1989.

Primary Examiner—Melvyn I. Marquis
Assistant Examiner—Karen A. Dean
Attorney, Agent, or Firm—Millen, White, Zelano & Branigan

[57] ABSTRACT

An air bag coating composition is obtained by emulsifying (A) an organopolysiloxane containing at least two alkenyl groups each attached to a silicon atom, (B) an organohydrogenpolysiloxane containing at least three hydrogen atoms each attached to a silicon atom, and (C) a curing catalyst in water in the presence of an emulsifier to form an aqueous silicone emulsion. The composition cures into a coating which firmly adheres to an air bag base fabric and provides a tack-free surface.

12 Claims, 1 Drawing Sheet

AIR BAG COATING COMPOSITION AND AIR BAG

This application is a continuation of application Ser. No. 08/008,107, filed Jan. 25, 1993, now abandoned.

FIELD OF THE INVENTION

This invention relates to an air bag coating composition and more particularly, to a coating composition suitable for forming a cured silicone coating which firmly adheres to air bag base fabric and provides a tack-free surface. It also relates to an air bag having a coating of the composition cured to base fabric.

BACKGROUND OF THE INVENTION

For safety, advanced automobiles are now loaded with air bags which are normally folded and stored in the steering wheel, but upon detection of shocks by collision, can be instantaneously inflated between the wheel and the driver to protect the driver from damages. The air bags are generally formed from nylon fabric by coating it with chloroprene rubber. These air bags undesirably have a short life since chloroprene rubber is less resistant against heat and weathering. The air bags are also required to be flame retardant so that they are resistant against a fire and explosion which can break out upon collision of the car. Since chloroprene rubber is less flame retardant, prior art air bags formed from chloroprene rubber-coated fabric are further coated with a flame retardant silicone on surfaces which might be exposed to flame.

Air bags formed from silicone rubber-coated fabric have the advantage of not requiring a flame retardant coating because well-known flame retardants can be blended in the silicone rubber to render the rubber itself flame retardant. Now air bag manufacturers are more interested in silicone rubber coating compositions for this reason and for their heat resistance and weather resistance.

The air bag using silicone rubber-coated fabric is designed so that it is normally folded within the automotive steering wheel, but instantaneously inflated when explosive gas is injected upon collision. On inflation, the coating applied to the air bag fabric is also instantaneously stretched following the air bag fabric. Thus not only the base fabric, but also the coating should be mechanically strong. To this end, the currently available silicone coating compositions use base polymers of relatively high molecular weight which contain curing agents, flame retardants, adhesion aids, reinforcements and other additives therein.

The coating compositions using high molecular weight base polymers, however, are quite difficult to apply to a coating thickness of 40 to 100 $\mu$m normally required for air bags using knife coaters, offset roll coaters, gravure coaters or the like. The coating compositions must be diluted with organic solvents to a sufficient viscosity to allow easy coating to base fabric.

However, the use of organic solvents leads to serious problems including the risk of electrostatic ignition and potential hazard to operators' health since organic solvents can be taken into the body by way of inhalation or skin contact. Cured coatings are formed on base fabric by applying an organic solvent diluted liquid of the coating composition and causing the solvent to evaporate off. The evaporated organic solvent must be recovered at any expense since it causes air pollution.

Among means for changing a coating composition to a solventless system, the simplest way is to reduce the degree of polymerization of a base polymer until the viscosity of a coating composition is reduced to a sufficient level to allow for coating by means of a knife coater or the like. However, a coating composition based on a polymer having a lower degree of polymerization forms a cured coating which is somewhat low in mechanical strength so that the coating can crack upon air bag inflation, allowing hot explosive gas to bleed out therethrough.

If the viscosity of a coating composition is reduced too low, the composition will strike through base fabric, typically plain weave fabric of nylon fibers, resulting in a less smooth surface. If the composition on the fabric rear surface is cured as struck-through and then wound up, the coated fabric gives rise to blocking. Additionally, the struck-through composition will adhere to rolls of the coating machine, adversely affecting operating efficiency and outer appearance. It is thus desired to have a silicone rubber coating composition having an adequate viscosity to allow coating without the need for organic solvent for dilution.

Furthermore, conventional silicone rubber coating compositions tend to form cured coatings which are tacky on their surface, also contributing to a blocking problem.

SUMMARY OF THE INVENTION

Therefore, an object of the present invention is to provide an air bag coating composition which is free of an organic solvent and thus hygienically safe to the operator, and which cures to a coating having firm adhesion to air bag base fabric and a tack-free surface. Another object of the invention is to provide an air bag having a cured coating of the coating composition formed thereon.

The present invention provides an air bag coating composition in the form of an aqueous silicone emulsion comprising (A) an organopolysiloxane containing at least two alkenyl groups each attached to a silicon atom in a molecule and having a viscosity of at least 300 centistokes at 25° C., (B) an organohydrogenpolysiloxane containing at least three hydrogen atoms each attached to a silicon atom in a molecule, and (C) a curing catalyst. Components (A), (B) and (C) are emulsified in water in the presence of an emulsifier to form the aqueous silicone emulsion. When this emulsion is applied to air bag base fabric such as plain weave fabrics of polyamide, polyester or the like and then cured, there are obtained cured coatings which have higher adhesion to the base fabric as compared with the coatings obtained by diluting the same components (A), (B) and (C) with an organic solvent. Also the cured coatings present a tack-free surface. In addition, they have good rubbery properties so that they undergo no cracks upon air bag inflation.

The aqueous silicone emulsion has an adequate viscosity for application to the base fabric without diluting it with organic solvent. The eliminated use of organic solvent insures a good working environment. The emulsion produces no hazard to the operator's health. The emulsion readily cures at room temperature simply by removing water. It cures at a very high rate if heated. In either case, it forms a cured coating having good rubbery properties including strength, elongation and hardness. Thus the aqueous silicone emulsion is a useful coating composition for air bags.

An air bag is also contemplated herein which includes a base fabric having applied thereon a cured coating of the above-defined composition.

A method of preparing an air bag is contemplated which comprises the steps of applying to an air bag fabric an air bag composition in the form of an aqueous silicone emulsion comprising (A) an organopolysiloxane containing at least two alkenyl groups each attached to a silicon atom in a molecule and having a viscosity of at least 300 centistokes at 25° C., (B) an organohydrogenpolysiloxane containing at least three hydrogen atoms each attached to a silicon atom in a molecule, and (C) a curing catalyst, and curing the air bag composition to form a cured coating having firm adhesion to the air bag fabric and a tack-free surface.

DETAILED DESCRIPTION OF THE INVENTION

Figure 1:
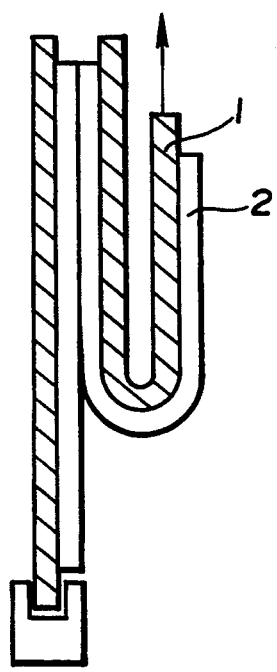
FIG. 1 schematically illustrates a surface tack test employed in the Example and Comparative Example.

Component (A) used herein is an organopolysiloxane containing at least two alkenyl groups each attached to a silicon atom in a molecule. The alkenyl groups include vinyl and allyl groups and mixtures thereof. No limits are imposed on organic groups other than the alkenyl groups attached to a silicon atom, molecular structure, degree of polymerization and the like. Preferably, component (A) is an organopolysiloxane of the following general formula:

$$R_a^1 SiO_{(4-a)/2} \quad (1)$$

wherein $R^1$, which may be identical or different, is a substituted or unsubstituted monovalent hydrocarbon group, preferably having 1 to 12 carbon atoms, especially 1 to 6 carbon atoms, and letter a is a positive number of 1.98 to 2.01. Examples of the monovalent hydrocarbon group include alkyl groups such as methyl, ethyl, propyl, butyl and hexyl groups; alkenyl groups such as vinyl and allyl groups; aryl groups such as phenyl and tolyl groups; and substituted ones of these groups wherein some or all of the hydrogen atoms are replaced by halogen atoms, cyano groups or the like, such as chloromethyl, 3,3,3-trifluoropropyl and cyanoethyl groups. Preferred groups represented by $R^1$ are methyl, ethyl, phenyl, δ-trifluoropropyl, cyanoethyl, vinyl and allyl groups. The organopolysiloxane should preferably contain two or more alkenyl groups as defined above and at the same time at least 50 mol %, especially at least 80 mol % of a methyl group. With a methyl content of less than 50 mol %, the properties inherent to methylpolysiloxane would be undesirably lost and the material cost would become higher.

The organopolysiloxane should have a viscosity of at least 300 centistokes (cs) at 25° C., especially $1 \times 10^4$ to $1 \times 10^8$ cs at 25° C. With a viscosity of less than 300 cs, the coating composition, when coated to a base fabric, forms a coating having mechanical strength below the practically acceptable level.

These organopolysiloxanes should preferably have a substantially linear molecular structure. The organopolysiloxanes are often blocked with a silanol, methyl or vinyl group, preferably with a trivinylsilyl group at the end of their molecular chain. The organopolysiloxanes may be prepared by conventional well-known methods, for example, by subjecting cyclic polysiloxanes which are well-known oligomers to ring-opening polymerization in the presence of acid or alkali.

Component (B) is an organohydrogenpolysiloxane containing at least three hydrogen atoms each attached to a silicon atom ($\equiv$SiH) in a molecule. It is preferably represented by the following general formula:

$$R_c^2 H_d SiO_{(4-c-d)/2} \quad (2)$$

wherein $R^2$ is an alkyl group having 1 to 10 carbon atoms such as methyl, letters c and d are positive numbers with the sum of c and d being 1 to 3. Some illustrative, non-limiting examples of the organohydrogenpolysiloxane are represented by the following structural formulae.

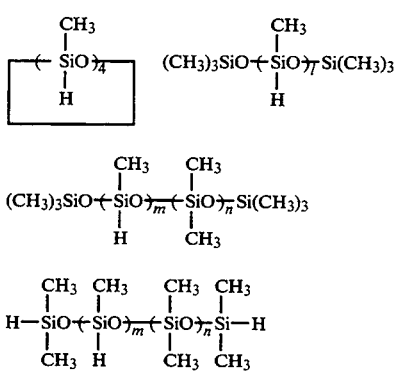

In the formulae, l, m and n are integers.

Component (B) is blended in such an amount to provide 0.5 to 4 $\equiv$SiH bonds per alkenyl group of component (A) and at the same time, in an amount of about 0.5 to 30 parts by weight per 100 parts by weight of component (A) in order to provide improved adhesion of the coating composition to base fabric. If the amount of component (B) exceeds 30 parts on this basis, the resulting cured coating would remain somewhat tacky on the surface and be insufficiently strong to prevent cracking.

Component (C) is a curing catalyst which may be selected from conventional platinum series catalysts. It is effective for promoting addition reaction between the alkenyl group in the organopolysiloxane as component (A) and the $\equiv$SiH bond in the organohydrogenpolysiloxane as component (B). Exemplary catalysts are platinum black, chloroplatinic acid, alcohol modified chloroplatinic acid, and complex salts of chloroplatinic acid with vinyl siloxanes. The catalyst is added in a catalytic amount, preferably in an amount of about 10 to 5,000 ppm, more preferably about 50 to 1,000 ppm based on the weight of component (A).

When a platinum or platinum compound as mentioned above is added to the composition, there is the risk that the composition will undergo scorching during storage. To prevent such undesirable phenomenon, a reaction retarder is preferably used in combination with the platinum catalyst. Exemplary retarders are methylvinylsiloxane, acetylene alcohol, and acetylene alcohol whose hydroxyl group is blocked with a trimethylsilyl group. The retarder, when used, is added in an amount of about 0.01 to 10 parts, preferably about 0.05 to 5 parts by weight per 100 parts by weight of component (A).

In order to enhance the adhesion of the coating composition to base fabric, any of the well-known adhesive aids such as organo-functional silanes and amino-functional silanes may be added to the coating composition. Also reinforcements such as colloidal silica may be added for reinforcing purposes.

The coating composition of the invention is in the form of an aqueous silicone emulsion which is prepared by emulsifying a blend containing components (A) to (C) in water in the presence of an emulsifier.

The emulsifiers used herein include anionic and non-ionic surfactants, for example, sulfonic acids, sulfuric acids, phosphoric acids and salts thereof capable of surface activation, more illustratively, alkylsulfates such as sodium laurylsulfate, aliphatic hydrocarbon group-substituted benzenesulfonates such as sodium dodecylbenzenesUlfonate, aliphatic hydrocarbon group-substituted naphthalene-sulfonates, polyethylene glycol sulfates, and lauryl phosphates.

Preferably the emulsifier is used in an amount of about 0.3 to 20 parts, more preferably about 0.5 to 5 parts by weight per 100 parts by weight of the organopolysiloxane as component (A). Less than 0.3 parts of the emulsifier on this basis would be less effective for helping emulsification, often failing to form an aqueous emulsion. More than 20 parts of the emulsifier would eventually yield an elastomer having low rubbery properties including strength, elongation and hardness.

Water is used in any desired amount to ensure formation of an aqueous emulsion suitable as an air bag coating composition. Often about 25 to 600 parts, especially about 50 to 200 parts by weight of water is used per 100 parts by weight of the organopolysiloxane as component (A).

The aqueous emulsion may be prepared by mixing components (A), (B) and (C) and thereafter mixing them with an emulsifier and water. Alternatively, components (A), (B) and (C) may be respectively mixed with an emulsifier and water to form aqueous emulsions, which are then mixed together.

If it is desired to increase the viscosity of the coating composition upon application, polyvinyl alcohol or similar thickeners may be added to the composition.

The base fabrics to which the coating composition is cured include fibers of nylon, Tetron, Vinylon, polyester and polyurethane and woven fabrics thereof, with nylon and polyester being preferred. A plain weave is the most useful weave.

The coating composition is applied to base fabric by any desired coating technique, for example, calendering, knife coating, brush coating, dipping, and spraying.

Thereafter, the coating is cured simply by allowing to stand at room temperature while removing water, but preferably by hot air vulcanization at 100° to 180° C. for several seconds to about 20 minutes. Thus cured products having a varying crosslinking density covering silicone rubber, silicone resin and silicone gel are obtained depending on the particular components used.

EXAMPLE

Examples of the present invention are given below by way of illustration and not by way of limitation. All parts are by weight.

EXAMPLE AND COMPARATIVE EXAMPLE

A composition designated A was prepared by mixing 100 parts of a methylvinylsiloxane consisting of 99.85 mol % of dimethylsiloxane units and 0.15 mol % of methylvinylsiloxane units, end-blocked with a dimethylvinylsiloxy group and having an average degree of polymerization of about 8,000 with 1.3 parts of a methyl-hydrogenpolysiloxane of the following formula (3), 0.05 parts of ethyl cyclohexanol as an addition reaction controlling agent, 100 ppm of platinum, and 3 parts of epoxy carbon functional silane of the following compositional formula (4). The blend was then mixed with 100 parts of water and 10 parts of dodecylbenzenesulfonate by means of a combination mixer to form an aqueous silicone emulsion, and polyvinyl alcohol was added to the emulsion for adjustment to a viscosity of about 100 poise.

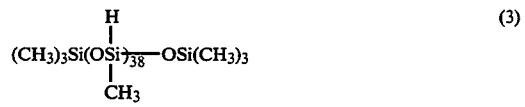

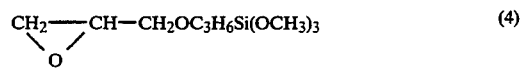

For comparison purposes, another composition designated B was prepared as above except that water, dodecylbenzenesulfonate and polyvinyl alcohol were omitted and instead, the blend was diluted with toluene to a viscosity of about 100 poise.

Each of the coating compositions A and B was applied to one surface of plain weave fabric of 420-denier nylon filaments (46 filaments/inch in warp and weft) to a dry coating thickness of about 100 μm. The coating was cured by allowing it to stand at a temperature of 25° C. and a relative humidity of 60% for 48 hours. There was obtained a coated fabric.

Figure 2:
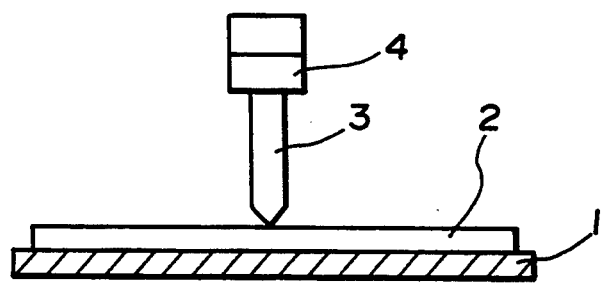
FIG. 2 schematically illustrates a test employed for examining cured property in the Example and Comparative Example.

These samples were examined by the tests shown in FIGS. 1 and 2 wherein the coated fabric consists of a nylon fiber fabric 1 and a cured silicone coating 2.

For examining tackiness, a tensile test was carried out as shown in FIG. 1. Two pieces of the coated fabric were mated together such that the coatings 2 faced each other. They were compression bonded a 25° C. under a pressure of 20 kgf/cm² for 12 hours and cut into a strip of 2.5 cm wide. Using a tensile tester, a 180° peel test was carried out as shown in FIG. 1. With one piece fixed, the free end of the other piece was pulled back at a rate of 10 mm/min. to measure the load required to peel the other piece from the one piece. The load indicates the surface tack of the cured silicone coatings.

Also, the samples were examined for cured property as shown in FIG. 2. The sample on the cured silicone coating 2 surface was scratched by moving back and forth a stainless steel tool 3 with a weight 4 of 200 grams resting thereon. The number of strokes of the scratching tool taken until the cured silicone coatings 2 was torn off from the nylon fabric 1 indicates the adhesion of the silicone coating to the nylon fabric.

The results of both tests are shown in Table 1.

TABLE 1

|  | Example | Comparative Example |
|---|---|---|
| Composition | A | B |
| Type | aqueous emulsion | solvent type |
| Viscosity, poise | 100 | 100 |
| Tack, g/2.5 cm wide | 0* | 200 |

TABLE 1-continued

| | Example | Comparative Example |
|---|---|---|
| Adhesion, strokes | >100 | 50 |

*separated by itself after compression bond

There has been described a coating composition adapted to apply to air bag base fabric which forms a cured coating having improved adhesion to the base fabric and a tack-free surface. The composition can be adjusted to an adequate viscosity for application without the need for organic solvent. Due to the eliminated use of organic solvent, the composition is fully safe during application and not harmful at all to the operator.

Although some preferred embodiments have been described, many modifications and variations may be made thereto in the light of the above teachings. It is therefore to be understood that within the scope of the appended claims, the invention may be practiced otherwise than as specifically described.

We claim:

1. An air bag comprising a base fabric having thereon a coating obtained by curing an aqueous silicone emulsion coating composition comprising
   (A) 100 parts by weight of an organopolysiloxane containing at least two alkenyl groups each attached to a silicon atom in a molecule and having a viscosity of at least 300 centistokes at 25° C.,
   (B) 0.5 to 30 parts by weight of an organohydrogenpolysiloxane containing at least three hydrogen atoms each attached to a silicon atom in a molecule, and
   (C) a catalytically effective amount of a curing catalyst
   (D) 0.3 to 20 parts by weight of an emulsifier, and
   (E) 25 to 600 parts by weight of water.

2. The air bag of claim 1, wherein, in the coating composition, component (A) is an organopolysiloxane of the formula:

wherein $R^1$ is independently a substituted or unsubstituted monovalent hydrocarbon group and letter a is a positive number of 1.98 to 2.01.

3. The air bag of claim 1, wherein, in the coating composition, component (B) is an organohydrogenpolysiloxane of the formula:

wherein $R^2$ is an alkyl group of 1 to 10 carbon atoms, letters c and d are positive numbers with the sum of c and d being from 1 to 3.

4. The air bag of claim 1, wherein said emulsifier is an anionic or nonionic surfactant.

5. The air bag of claim 1, wherein the coating composition is free of an organic solvent.

6. The air bag of claim 2, wherein $R^1$ is a monovalent hydrocarbon group of 1 to 12 carbon atoms, optionally substituted by halogen atoms or cyano groups.

7. The air bag of claim 1, wherein the organopolysiloxane (A) has a viscosity of $1 \times 10^4$ to $1 \times 10^8$ centistokes at 25° C.

8. The air bag of claim 1, wherein the curing catalyst is a platinum series catalyst.

9. The air bag of claim 1, wherein the emulsifier is selected from the group consisting of sulfonic acids, sulfuric acids, phosphoric acids, alkylsulfates, aliphatic hydrocarbon group-substituted benzenesulfonates, aliphatic hydrocarbon group-substituted naphthalenesulfonates, polyethylene glycol sulfates and lauryl phosphates.

10. The air bag of claim 1, wherein the emulsifier is present in the coating composition in an amount of 0.5 to 5.0 parts by weight.

11. The air bag of claim 1, wherein the coating composition is cured by hot air vulcanization at 100° to 180° C.

12. A method of preparing an air bag comprising the steps of
   applying to an air bag fabric an air bag composition in the form of an aqueous silicone emulsion comprising
      (A) an organopolysiloxane containing at least two alkenyl groups each attached to a silicon atom in a molecule and having a viscosity of at least 300 centistokes at 25° C.,
      (B) an organohydrogenpolysiloxane containing at least three hydrogen atoms each attached to a silicon atom in a molecule, and
      (C) a curing catalyst, and
   curing the air bag composition to form a cured coating having firm adhesion to the air bag fabric and a tack-free surface.

* * * * *